US010017670B2

(12) United States Patent
Grisle et al.

(10) Patent No.: US 10,017,670 B2
(45) Date of Patent: Jul. 10, 2018

(54) CLEAN RELEASE, STRETCH RELEASABLE TAPE

(71) Applicant: 3M INNOVATIVE PROPERTIES COMPANY, St. Paul, MN (US)

(72) Inventors: Roger A. Grisle, Woodbury, MN (US); Harold T. Munson, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 358 days.

(21) Appl. No.: 14/382,497

(22) PCT Filed: Feb. 25, 2013

(86) PCT No.: PCT/US2013/027558
§ 371 (c)(1),
(2) Date: Sep. 2, 2014

(87) PCT Pub. No.: WO2013/134000
PCT Pub. Date: Sep. 12, 2013

(65) Prior Publication Data
US 2015/0020961 A1    Jan. 22, 2015

Related U.S. Application Data

(60) Provisional application No. 61/608,287, filed on Mar. 8, 2012.

(51) Int. Cl.
*C09J 7/02*        (2006.01)
*C09J 133/08*      (2006.01)
*B32B 7/06*        (2006.01)
*B32B 7/12*        (2006.01)
*B32B 15/088*      (2006.01)
*B32B 15/09*       (2006.01)
*B32B 37/12*       (2006.01)
*B32B 38/10*       (2006.01)
*C09J 171/02*      (2006.01)
*C09J 7/38*        (2018.01)
*C09J 7/25*        (2018.01)
(Continued)

(52) U.S. Cl.
CPC .............. *C09J 7/0282* (2013.01); *B32B 7/06* (2013.01); *B32B 7/12* (2013.01); *B32B 15/088* (2013.01); *B32B 15/09* (2013.01); *B32B 37/12* (2013.01); *B32B 38/10* (2013.01); *C08L 67/00* (2013.01); *C08L 77/00* (2013.01); *C09J 7/25* (2018.01); *C09J 7/255* (2018.01); *C09J 7/385* (2018.01); *C09J 133/08* (2013.01); *C09J 171/02* (2013.01); *B32B 2250/02* (2013.01); *B32B 2250/03* (2013.01); *B32B 2255/10* (2013.01); *B32B 2255/26* (2013.01); *B32B 2307/748* (2013.01); *B32B 2311/24* (2013.01); *B32B 2311/30* (2013.01); *B32B 2367/00* (2013.01); *B32B 2377/00* (2013.01); *B32B 2405/00* (2013.01); *C08G 2261/126* (2013.01); *C09J 2433/00* (2013.01); *C09J 2467/006* (2013.01); *C09J 2477/006* (2013.01); *Y10T 428/2891* (2015.01); *Y10T 428/3175* (2015.04); *Y10T 428/31699* (2015.04); *Y10T 428/31797* (2015.04)

(58) Field of Classification Search
CPC .... C09J 171/02; C09J 133/08; C09J 2433/00; C09J 2467/006; C09J 2477/006; C09J 7/0217; C09J 7/0282; C09J 7/0285; C09J 171/00; C09J 7/02; B32B 15/088; B32B 15/09; B32B 2250/02; B32B 2250/03; B32B 2255/10; B32B 2255/26; B32B 2307/748; B32B 2311/24; B32B 2311/30; B32B 2367/00; B32B 2377/00; B32B 2405/00; B32B 37/12; B32B 38/10; B32B 7/06; B32B 7/12; C08L 77/00; G08G 2261/126; Y10T 428/2861; Y10T 428/31699; Y10T 428/3175; Y10T 429/31797
See application file for complete search history.

(56) References Cited

U.S. PATENT DOCUMENTS 4,024,312 A    5/1977    Korpman
4,071,652 A    1/1978    Brullo
5,035,687 A    7/1991    Sandbank
(Continued)

FOREIGN PATENT DOCUMENTS

EP    0369092    5/1990
EP     761793    8/1996
(Continued)

OTHER PUBLICATIONS

International Search Report for PCT International Application No. PCT/US2013/027558, dated Jun. 14, 2013, 3pgs.

*Primary Examiner* — Arti Singh-Pandey
(74) *Attorney, Agent, or Firm* — Adam Bramwell; Ann K. Gallagher

(57) ABSTRACT

Adhesive tape for bonding that can be detached without leaving residue and without damaging the surface of a substrate when stretched in a direction of a bond plane. An adhesive tape includes an elastomeric backing having opposing first and second surfaces an acrylate pressure sensitive adhesive disposed on at least one of the first and second surfaces of the backing. The backing includes a copolymer selected from the group consisting of polyether-polyester, polyether-polyamide, and a combination thereof and from about 20 to 60 wt % of a tackifier, based on the total weight of the backing. The backing has an elongation at break greater than 500%.

20 Claims, No Drawings

(51) Int. Cl.
*C08L 67/00* (2006.01)
*C08L 77/00* (2006.01)

(56) References Cited

U.S. PATENT DOCUMENTS

| | | | |
|---|---|---|---|
| 5,145,718 | A | 9/1992 | Pedginski |
| 5,176,948 | A | 1/1993 | Nguyen |
| 5,516,581 | A | 5/1996 | Kreckel |
| 5,672,400 | A | 9/1997 | Hansen |
| 6,284,378 | B1 | 9/2001 | Junghans |
| 6,455,151 | B1 | 9/2002 | Sakashita |
| 7,078,093 | B2 | 7/2006 | Sheridan |
| 7,078,582 | B2 * | 7/2006 | Stebbings ............... A61F 13/02 602/54 |
| 8,202,934 | B2 | 6/2012 | Sherman |
| 2005/0176872 | A1 | 8/2005 | Martin |
| 2008/0135159 | A1 | 6/2008 | Bries |

FOREIGN PATENT DOCUMENTS

| | | |
|---|---|---|
| EP | 563272 | 2/1997 |
| EP | 0870418 | 10/1998 |

\* cited by examiner

CLEAN RELEASE, STRETCH RELEASABLE TAPE

CROSS REFERENCE TO RELATED APPLICATIONS

This application claims the benefit of U.S. Provisional Application No. 61/608,287, filed Mar. 8, 2012, the disclosure of which is incorporated by reference herein in its/their entirety.

TECHNICAL FIELD

An adhesive tape that is stretch releasable, articles that include the adhesive tape, and method of decoupling a stack of substrate using the adhesive tape are described.

BACKGROUND

Stretch releaseable films and tapes have been used to bond substrates together or to bond articles to substrates. Commercially available stretch release adhesives for bonding articles to substrates are available under Command™ brand from 3M Company and under the Powerstrip® brand from tesa SE. Many of these stretch release tapes and films include an adhesive-free tab portion as part of the product construction allowing a user to grab and pull the tape thereby releasing it from the attached surfaces. While these stretch releasable films and tapes have been useful, there remains a need to provide other stretch releasable articles.

SUMMARY

The present disclosure provides a stretch releasable adhesive tape, articles incorporating these tapes and methods of bonding these tapes. Advantageously, the adhesive tapes of the present disclosure are stretch releasable without relying on a tab portion. Additionally, the stretch releasable adhesive tapes of the present disclosure remove cleanly from the substrates to which they are attached without leaving residue and without damaging the substrate's surface.

In one aspect, the present disclosure relates to an adhesive tape comprising or consisting essentially of: (a) an elastomeric backing having opposing first and second surfaces, the backing comprising (i) a copolymer selected from the group consisting of polyether-polyester, polyether-polyamide, and a combination thereof and (ii) from about 20 to 60 wt % of a tackifier, based on the total weight of the backing, and wherein the backing has an elongation at break greater than 500%; and (b) an acrylate pressure sensitive adhesive disposed on at least one of the first and second surfaces of the backing, wherein when the article is disposed on a substrate, the article is capable of being stretched along a first direction and release from the substrate.

In another aspect, the present disclosure relates to an article comprising (a) a first substrate; (b) an adhesive tape adhered to the first substrate, the adhesive tape comprising (1) an elastomeric backing having opposing first and second surfaces, the backing comprising (i) a copolymer selected from the group consisting of polyether-polyester, polyether-polyamide, and a combination thereof; and (ii) from about 20 to 60 wt % of a tackifier, based on the total weight of the backing, and wherein the backing has an elongation at break greater than 500%; and (2) an acrylate pressure sensitive adhesive disposed on at least one of the first and second surfaces of the backing.

In yet another aspect, the present disclosure relates to a method of coupling and decoupling a stack of substrates, the method comprising the steps of: (a) providing a first and a second substrate; (b) adhering the adhesive tape between the first and the second substrates thereby coupling them to the stack, the adhesive tape comprising: (1) an elastomeric backing having opposing first and second surfaces, the backing comprising (i) a copolymer selected from the group consisting of polyether-polyester, polyether-polyamide, and a combination thereof; and (ii) from about 20 to 60 wt % of a tackifier, based on the total weight of the backing, and wherein the backing has an elongation at break greater than 500%; and (2) an acrylate pressure sensitive adhesive disposed on the first and second surfaces of the backing; (c) heating the stack to the softening temperature of the tape adhesive; (d) removing the first substrate from the stack to expose the adhesive tape; and (e) pulling the adhesive tape along its length to stretch release the adhesive tape from the second substrate.

The adhesive tapes of the present disclosure can be provided as a single sided tape, where the adhesive is disposed on one side of the backing, or as a double sided-tape, where the adhesive is disposed on both sides of the backing. The adhesive tapes can be used in a wide variety of applications ranging from assembly of components in consumer electronic devices (such as mobile hand-held devices, e.g., various types of phones, tablets, and the like) to bonding any two substrates together and later decoupling one substrate from another.

DETAILED DESCRIPTION

Unless otherwise indicated, all numbers expressing feature sizes, amounts and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art using the teachings disclosed herein.

The recitation of numerical ranges by endpoints includes all numbers within that range (e.g., 1 to 5 includes, 1, 1.5, 2, 2.75, 3, 3.80, 4 and 5) and any range within that range.

In one aspect, the present disclosure provides for an adhesive tape that exhibits stretch release properties. The adhesive tape includes an elastomeric backing having opposing first and second surfaces and an acrylate pressure sensitive adhesive disposed on at least one of the first and second surfaces.

Elastomeric Backing

Suitable elastomeric backings include copolymers of polyether-polyester, polyether-polyamide, and a combination thereof. Commercially available polyether-polyester copolymer resins include those available under the Hytrel® brand from DuPont, Del. and particularly useful is Hytrel® 4056 resin. Commercially available polyether-polyamide copolymer resins include those available under the Pebax™ brand from Arkema Inc., Pennsylvania and particularly useful is Pebax™ 3533 resin. U.S. Pat. No. 5,672,400 (Hansen et al.) discloses use of Pebax™ resin in column 7, lines 40 to lines 65, the entire disclosure of which incorporated by reference in its entirety.

Tackifier resins are also part of the elastomeric resins. Suitable tackifier resins include is selected from the group consisting of terpene resins, terpene phenol resins, aromatic modified terpene resins, cumarone-indene resin, natural resin rosin, modified rosin, glycerol ester rosin, pentaerythritol ester rosin, allylphenol formaldehyde resins, xylene formaldehyde resins, styrene resins, dicyclopentadiene resins, and mixtures thereof. The tackifier is present from 20 to 60 wt %, based on the total weight of the backing.

The elastomeric backing is selected to have suitable mechanical properties for use in a stretch release adhesive tape. For example, the elastomeric backing is selected so that it can be stretched (elongated) when pulled in a first direction (e.g., a lengthwise direction) at least 50 percent without breaking That is, at least one dimension such as the length can be increased at least 50 percent through stretching without breaking the backing layer. In some embodiments, the elastomeric backing can be stretched at least 100 percent, at least 150 percent, at least 200 percent, at least 300 percent, at least 400 percent, or at least 500 percent without breaking. The elastomeric backing can often be stretched up to 800 percent.

Adhesive

Acrylic pressure sensitive adhesives are suitable for use in the present disclosure. The acrylic adhesive is typically protected by a liner when the adhesive tape of the present disclosure is supplied in rolled form, such as a transfer tape.

Additives

Other additives can be included in the backing, adhesive or both to impart specific properties. Such additives include organic fillers, inorganic fillers, chemical or physical blowing agents, anti-microbials, glass or polymeric bubbles or beads (which may be expanded or unexpanded), fibers, reinforcing agents, hydrophobic or hydrophilic silica, toughening agents, nanoparticles, fire retardants, antioxidants, finely ground polymeric particles such as polyester, nylon, and polypropylene, and stabilizers, such as heat or UV stabilizers. Additionally, pigments and/or dyes may be added to change the color of the backing, adhesive or both. Pigments or dyes which produce a black or white tape are sometimes preferred.

Adhesive Tape

The adhesive layers as well as elastomeric backing of the adhesive tape are typically highly extensible. Pulling on the tape causes the adhesive tape to elongate or stretch. Stretching reduces the volume of the adhesive tape in the region between the first substrate and the second substrate and facilitates release of the adhesive tape from one or both substrates. Pulling on the tab can release the adhesive layers from both substrates if the adhesive layers have sufficient cohesive strength, if the adhesive layers adhere more strongly to the backing layer than to the substrates, and if the adhesive tape can be elongated sufficiently to reduce its volume between the substrates without breaking or snapping back into its original position or dimensions. The stretched adhesive tape can be removed from between the two substrates, the two substrates can be separated, or both. The adhesive tape typically can be stretched at least 50 percent in a first direction (often the first direction is lengthwise and the length can be increased at least 50 percent) without breaking or snapping under the stretch releasing conditions.

Unlike stretch releasable tapes of the prior art, no tab is needed on the adhesive tape of the present invention to facilitate or initiate the stretch release. A user simply pulls on the adhesive tape of the present disclosure in a direction that is along the plane of the bond to stretch release.

When the adhesive tape of the present disclosure is stretched along a major axis and is released from the substrate, greater than 90% of the substrate surface previously in contact with the adhesive is free of adhesive residue. Preferably after the adhesive tape is stretched along a major axis and is released from the substrate, substantially no adhesive residue remains on the substrate.

Substrates

The adhesive tape of the present disclosure can be used to adhere a variety of substrates to themselves or to other substrates. Illustrative substrates include metals and metal alloys, such as stainless steel, zinc; ceramics, such as glass; and polymers, such as polyethersulfone, polycarbonate (e.g., those sold under the "LEXAN" brand), polyamide (commonly referred to as nylon), aramid (e.g., those sold under the "KEVLAR" brand), polycaprolactam, polyethylene terephthalate (e.g., those sold under the "MYLAR" brand), polyetheretherketone, acrylonitrile butadiene styrene, polymethylmethacrylate, polyimide (e.g., those sold under the "KAPTON" brand), polyphenylene, polyurethane (e.g., e.g., those sold under the "ESTANE" brand), polyoxymethylene, acetal (e.g., those sold under the "DELRIN" brand), polystyrene, polyisobutylene, polypropylene and polyethylene.

Examples

Test Methods

PSA Adhesion Measurements

Following ASTM D3330, a 180 peel test was conducted using a 1 inch (2.5 cm) wide piece of tape laminated to a 2 mil (0.051 mm) thick aluminum sheet. This construction was laminated to a 2 inch (5.1 cm)×5 inch (12.7 cm)×⅛ inch (0.32 cm) stainless steel substrate. Samples were mounted in a tensile tester such that the bottom jaw held one end of the stainless steel substrate and the top jaw held the 180° looped laminated aluminum tape end. Two sets of three tape samples were prepared. One set of samples was peel tested after 15 minutes of dwell time, after lamination. The other set was tested 72 hours after lamination. A MTS—Insight Electromechanical 30 kN extended length tensile testing apparatus, from MTS Systems Corporation, Eden Prairie, Minn. was used for the peel test. Adhesion values are in units of oz/in.

Backing Elongation Measurements

Elongation measurements on the backings were made using a modified version of ASTM D638-10. The sample dimensions of the dumbbells were as follows, the length overall (LO) was 4.5 inch (11.4 cm), the width overall was 0.75 inch (1.9 cm), the width of the narrow section (W) was 0.25 inch (0.64 cm) and the length of the narrow section (L) was 1.25 inch (3.18 cm). The same tensile testing apparatus used for PSA adhesion measurements was used for elongation testing. The jaws of the tensile testing apparatus were mounted to the dumbbell, such that, the distance between the jaws was 2 inch (5.1 cm). The extension rate was 2 inch/min (5.1 cm/min). The reported value for the elongation was the % elongation at break.

Stretch Release Measurements

Tape samples 0.5 inch (1.3 cm) wide by about 5 inch (12.7 cm) in length were laminated by hand, using a 4.5 lb (2.0 kg) rubber roller, to a 2 inch (5.1 cm)×5 inch (12.7 cm)×⅛ inch (0.32 cm) stainless steel substrate. Removal of the tape from the substrate was conducted by hand, by lifting one edge of the tape away from the substrate and then pulling the tape at an angle 30° from the plane of the substrate until the tape was removed from the substrate via a stretch release mechanism. The surface of the substrate previously in contact with the adhesive was then observed for residual adhesive. A sample passed the test if greater than 90% of the substrate surface previously in contact with the adhesive was free of adhesive residue.

| Materials | |
|---|---|
| Abbreviation or Trade Name | Description |
| Pebax 3533 | A polyether block amide thermoplastic elastomer, available under the trade designation "PEBAX 3533" from Arkema Inc., Prussia, Pennsylvania. |
| Hytrel 4056 | A thermoplastic polyester elastomer, available under the trade designation "HYTREL 4056" from E. I. du Pont de Nemours, Wilmington, Delaware. |
| SP-560 | A thermoplastic rosin-based resin, terpene phenolic resin, available under the trade designation "SP-560" from SI Group, Inc., Schenectady, New York. |
| Sylvares TP 2040 | A thermoplastic terpene phenolic resin, available under the trade designation "SYLVARES TP 2040" from Arizona Chemical, Jacksonville, Florida. |
| SMA 3000P | A styrene maleic anhydride resin with a molar ratio styrene/maleic anhydride close to 3/1, available under the trade designation "SMA 3000P" from Sartomer USA, LLC, Exton, Pennsylvania. |
| Irganox 1010 | A sterically hindered phenolic primary antioxidant, pentaerythritol tetrakis(3-(3,5-di-tert-butyl-4-hydroxyphenyl)propionate), available under the trade designation "IRGANOX 1010" from BASF, Ludwigshafen, Rhineland-Palatinate, Germany. |
| PSA1 | A 2 mil thick, acrylic PSA available under the trade designation "3M ADHESIVE TRANSFER TAPE 467MP" from 3M Company, St. Paul, Minnesota. |
| PSA2 | A 2 mil thick, acrylic PSA available under the trade designation "3M ADHESIVE TRANSFER TAPE 9471LE" from 3M Company. |
| PSA3 | A 2 mil thick, acrylic PSA available under the trade designation "3M ADHESIVE TRANSFER TAPE 9442" from 3M Company. |
| PSA4 | A 2 mil thick, acrylic PSA available under the trade designation "3M ADHESIVE TRANSFER TAPE 9626" from 3M Company. |

Backing1 Preparation

Backing1 was prepared using a DSM 15 cc Micro-Compounder available from DSM Xplore, Geleen, The Netherlands. 15 g of Pebax 3533 resin were weighed out and then poured into the hopper of the compounder. The six zones of the compounder were all set to 190° C. The compounder rpm was set at 50 rpm and the compounder was configured to run in a co-rotating mode. The extrudate was collected into a pan, where it cooled and solidified. A heated, 9 inch (22.9 cm) wide notch bar coater, having a 10 mil (0.25 mm) gap, was used to prepare film samples. The collected extrudate was placed between two silicone release liners, 3 mil (0.076 mm) thick each, which were placed on the bed of the coater. The material was heated on the coater to at least 200° C. Once the extrudate had melted, the resin and liners were pulled through the notch bar gap, producing a film sample 16 inch (40.6 cm)×9 inch (22.9 cm) with a thickness of 4 mils (0.10 mm).

Backing2 Preparation

Backing2 was prepared similarly to Backing1 except 7.65 g of Pebax 3533 and 7.35 g of SP-560 were pre-blended in a container, prior to pouring into the hopper of the compounder.

Backing3 Preparation

Backing3 was prepared similarly to Backing2 except 7.95 g of Pebax 3533 and 7.05 g of SP-560 were pre-blended in a container.

Backing4 Preparation

Backing4 was prepared similarly to Backing2 except 10.8 g of Pebax 3533 and 4.2 g of Hytrel 4056 were pre-blended in a container.

Backing5 Preparation

Backing5 was prepared similarly to Backing2 except 6.35 g of Pebax 3533, 2.52 g of Hytrel 4056 and 6.14 g of SP-560 were pre-blended in a container.

Backing6 Preparation

Backing6 was prepared similarly to Backing2 except 6.62 g of Pebax 3533, 2.61 g of Hytrel 4056 and 5.78 g of SP-560 were pre-blended in a container.

Backing7 Preparation

Backing6 was prepared similarly to Backing2 except 6.14 g of Pebax 3533, 2.43 g of Hytrel 4056, 5.93 g of SP-560, 0.51 g of SMA-3000P were pre-blended in a container.

Backing8 Preparation

Backing6 was prepared similarly to Backing2 except 6.38 g of Pebax 3533, 2.52 g of Hytrel 4056, 5.58 g of SP-560, 0.53 g of SMA-3000P were pre-blended in a container.

Backing9 Preparation

Backing 9 was a commercially available 4 mil (0.10 mm) film available under the trade designation "3M Thermal Bonding Film 668" from 3M Company.

Examples were prepared by hand laminating a piece of PSA to a backing A piece of adhesive transfer tape was cut to a similar size as that of the backing Using a 4.5 lb (2.0 kg) rubber roller, the exposed PSA transfer tape surface was laminated to the backing Table 1 indicates the specific Backing-PSA combinations examined. Using the test methods described above, the PSA adhesion to the backing, the elongation at break of the backing and the stretch release behavior of the Examples were measured. Results are shown in Table 1.

TABLE 1

| Example | Backing | PSA | PSA Adhesion (oz/inch) | Elongation at Break (%) for backing only | Stretch Release (Pass/Fail) |
|---|---|---|---|---|---|
| Example 1 | Backing 2 | PSA2 | — | 987 | Pass |
| Example 2 | Backing 3 | PSA2 | — | 850 | Pass |
| Example 3 | Backing 5 | PSA2 | — | 1078 | Pass |
| Example 4 | Backing 6 | PSA2 | — | 1057 | Pass |
| Example 5 | Backing 7 | PSA2 | — | 971 | Pass |
| Example 6 | Backing 8 | PSA2 | — | 970 | Pass |
| Example 7 | Backing 9 | PSA1 | 140 | 900 | Pass |
| Example 8 | Backing 9 | PSA2 | 150 | 900 | Pass |
| Example 9 | Backing 9 | PSA3 | 146 | 900 | Pass |
| Example 10 | Backing 9 | PSA4 | 150 | 900 | Pass |
| Comparative Example 11 | Backing 1 | PSA2 | — | 873 | Fail |
| Comparative Example 12 | Backing 4 | PSA2 | — | 780 | Fail |

What is claimed is:

1. An adhesive tape comprising:
    (a) an elastomeric backing having opposing first and second surfaces, the backing comprising (i) a copolymer selected from the group consisting of polyether-polyester, polyether-polyamide, and a combination thereof and (ii) from about 20 to 60 wt % of a tackifier, based on the total weight of the backing, and wherein the backing has an elongation at break greater than 500%; and
    (b) an acrylate pressure sensitive adhesive disposed on the first and second surfaces of the backing,
    wherein when the adhesive tape is disposed between two substrates, and the adhesive tape is capable of being stretched along a first direction and released from the substrates.

2. The adhesive tape of claim 1, wherein the adhesive tape does not include a tab to initiate the stretching.

3. The adhesive tape of claim 1, wherein after the adhesive tape is stretched along a major axis and is released from the substrate, greater than 90% of the substrate surface previously in contact with the adhesive is free of adhesive residue.

4. The adhesive tape of claim 1, wherein after the adhesive tape is stretched along a major axis and is released from the substrate, substantially no adhesive residue remains on the substrate.

5. The adhesive tape of claim 1, wherein the backing has an elongation at break greater than 800%.

6. The adhesive tape of claim 1, wherein the tackifier is selected from the group consisting of terpene resins, terpene phenol resins, aromatic modified terpene resins, cumarone-indene resin, natural resin rosin, modified rosin, glycerol ester rosin, pentaerythritol ester rosin, allylphenol formaldehyde resins, xylene formaldehyde resins, styrene resins, dicyclopentadiene resins, and mixtures thereof.

7. The adhesive tape of claim 6, wherein the tackifier is selected from the group consisting of terpene resins, terpene phenol resins, aromatic modified terpene resins and mixtures thereof.

8. An article comprising
(a) a first substrate;
(b) an adhesive tape adhered to the first substrate, the adhesive tape comprising
   (1) an elastomeric backing having opposing first and second surfaces, the backing comprising:
      (i) a copolymer selected from the group consisting of polyether-polyester, polyether-polyamide, and a combination thereof; and
      (ii) from about 20 to 60 wt % of a tackifier, based on the total weight of the backing, and wherein the backing has an elongation at break greater than 500%; and
   (2) an acrylate pressure sensitive adhesive disposed on at least one of the first and second surfaces of the backing.

9. The article of claim 8, wherein the substrate is selected from the group consisting of metal, glass and polymers.

10. The article of claim 8 further comprising a second substrate and wherein the adhesive tape comprises acrylate adhesives on the first and second surfaces of the elastomeric backing and wherein the adhesive tape is sandwiched in between and adheres to the first and second substrates.

11. The article of claim 8, wherein the adhesive tape does not include a tab to initiate the stretching.

12. The adhesive tape of claim 8, wherein after the adhesive tape is stretched along a major axis and is released from the substrate, greater than 90% of the substrate surface previously in contact with the adhesive is free of adhesive residue.

13. The article of claim 8, wherein after the adhesive tape is stretched along a major axis and is released from the first substrate, substantially no adhesive residue remains on the first substrate.

14. The article of claim 8, wherein the backing has an elongation at break greater than 800%.

15. The article of claim 8, wherein the tackifier is selected from the group consisting of terpene resins, terpene phenol resins, aromatic modified terpene resins, cumarone-indene resin, natural resin rosin, modified rosin, glycerol ester rosin, pentaerythritol ester rosin, allylphenol formaldehyde resins, xylene formaldehyde resins, styrene resins, dicyclopentadiene resins and mixtures thereof.

16. The adhesive tape of claim 15, wherein the tackifier is selected from the group consisting of terpene resins, terpene phenol resins, aromatic modified terpene resins and mixtures thereof.

17. A method of coupling and decoupling a stack of substrates, the method comprising the steps of:
(a) providing a first and a second substrate;
(b) adhering the adhesive tape between the first and the second substrates thereby coupling them to the stack, the adhesive tape comprising: (1) an elastomeric backing having opposing first and second surfaces, the backing comprising (i) a copolymer selected from the group consisting of polyether-polyester, polyether-polyamide, and a combination thereof; and (ii) from about 20 to 60 wt % of a tackifier, based on the total weight of the backing, and wherein the backing has an elongation at break greater than 500%; and (2) an acrylate pressure sensitive adhesive disposed on the first and second surfaces of the backing;
(c) heating the stack to the softening temperature of the tape adhesive;
(d) removing the first substrate from the stack to expose the adhesive tape; and
(e) pulling the adhesive tape along its length to stretch release the adhesive tape from the second substrate.

18. The method of coupling and decoupling a stack of substrates of claim 17, wherein after the adhesive tape is pulled along its length and is released from the second substrate, greater than 90% of the substrate surface previously in contact with the adhesive is free of adhesive residue.

19. The method of coupling and decoupling a stack of substrates of claim 17, wherein after the adhesive tape is pulled along its length and is released from the second substrate, substantially no adhesive residue remains on the substrate.

20. The method of coupling and decoupling a stack of substrates of claim 17, wherein the tackifier is selected from the group consisting of terpene resins, terpene phenol resins, aromatic modified terpene resins, cumarone-indene resin, natural resin rosin, modified rosin, glycerol ester rosin, pentaerythritol ester rosin, allylphenol formaldehyde resins, xylene formaldehyde resins, styrene resins, dicyclopentadiene resins and mixtures thereof.

* * * * *